(12) United States Patent  
Muhlenbruck

(10) Patent No.: US 7,891,067 B2  
(45) Date of Patent: Feb. 22, 2011

(54) ELASTIC BAND EXPANDER

(76) Inventor: Blake D. Muhlenbruck, 2738 Montego Bay, Evans, CO (US) 80620

( * ) Notice: Subject to any disclaimer, the term of this patent is extended or adjusted under 35 U.S.C. 154(b) by 746 days.

(21) Appl. No.: 11/925,494

(22) Filed: Oct. 26, 2007

(65) Prior Publication Data

US 2009/0106966 A1 Apr. 30, 2009

(51) Int. Cl.  
*B23P 19/04* (2006.01)

(52) U.S. Cl. ............... 29/235; 29/272; 29/282; 29/428; 72/402

(58) Field of Classification Search ........... 29/235, 29/238, 239, 428, 272, 282; 72/402  
See application file for complete search history.

(56) References Cited

U.S. PATENT DOCUMENTS

| 2,601,547 | A | | 6/1952 | Minock |
| 2,700,387 | A | | 1/1955 | Minock |
| 3,281,927 | A | | 11/1966 | Buslaff |
| 3,600,788 | A | | 8/1971 | Armand |
| 4,785,656 | A | * | 11/1988 | Kennedy ............... 72/402 |
| 4,989,443 | A | * | 2/1991 | Sawdon ............... 72/402 |
| 5,257,525 | A | * | 11/1993 | Clarke ............... 72/402 |
| 5,323,697 | A | * | 6/1994 | Schrock ............... 100/232 |
| 5,666,711 | A | * | 9/1997 | Pfeiffer ............... 29/272 |
| 5,720,197 | A | * | 2/1998 | Grau et al. ............... 72/402 |
| 6,324,884 | B1 | * | 12/2001 | Barjesteh et al. ............... 72/402 |
| 7,043,806 | B2 | * | 5/2006 | Schrock et al. ............... 29/237 |
| 2009/0106966 | A1 | * | 4/2009 | Muhlenbruck ............... 29/428 |

* cited by examiner

*Primary Examiner*—Lee D Wilson  
(74) *Attorney, Agent, or Firm*—Brian D. Smith, P.C.

(57) ABSTRACT

An elastic band expander tool has a base plate and a cam plate rotatably secured to each other for rotation about an axis. The cam plate has three slots, each of which curves inwardly towards the axis at its outer end. The base plate has three expander bars moveably mounted on it, each of which has a finger extending therefrom and a cam pin for moving in an associated cam slot. When the cam plate is rotated on the base plate, the cam pins ride in the slots and move outwardly away from the axis. This movement causes the expander bars to move outwardly, thereby expanding an elastic band fitted about the fingers. When the cam pins reach the end of their respective cam slots, the tool locks in place, to provide hands-free operation.

8 Claims, 4 Drawing Sheets

ELASTIC BAND EXPANDER

TECHNICAL FIELD

This invention relates to a tool for expanding an elastic band, and more particularly to a tool for expanding an elastic collar and maintaining the collar in an open position so that it may be easily positioned over an article to be collared and released into a clamping position thereon.

BACKGROUND ART

Devices for expanding an elastic band so that the band may be placed around an object have long been used. Various applications of such devices include animal castration, application of O-rings to machine parts, application of closing bands to sacks or bags, the application of sealing bands to hose fittings and the like, and the collaring of various materials to hold them together.

One example of an elastic band expander is the device of U.S. Pat. No. 3,600,788 to Armand, which provides a tool for castrating animals. The Armand tool includes two handles, one to be activated by either hand, which operate to stretch a rubber band around a cylindrical sleeve. The Armand device requires the use of both hands at all times during the operation to stretch and hold the rubber band open. While this is effective for the intended purpose of the invention, other applications of an elastic band expander would be better served by a device that could be operated with a single hand, and which had the capability of locking in the open position in order to allow better placement of the article to be collared. U.S. Pat. No. 3,281,927 to Buslaff provides a tool for dilating elastic rings and tubes, particularly for use in the manufacture of teat cups for milking machines. The Buslaff tool also provides handles, which activate a set of lever arms to stretch an elastic band. However, like the Armand tool, the Buslaff tool does not provide any locking capability for holding the elastic band in an open position without requiring continuous hand pressure by the operator.

U.S. Pat. No. 2,601,547 to Minock provides a tool directed primarily at animal castration. Minock utilizes a set of expanding elements which have pins riding in cam slots. Handles are used to cause the pins to move outward in the cam slots, thereby moving the expanding elements outward and expanding the elastic band. However, the Minock device also suffers from the lack of any locking capability. Minock's later U.S. Pat. No. 2,700,387 recognizes this shortcoming, and provides a spring-loaded locking pin for holding the device in an open position. However, the operator of Minock's '387 device must first choose whether or not to engage the locking function of the pin. Once the locking function is engaged, a spring will force the locking pin into a hole when the device is fully opened, thereby locking the device in the open position. In order to unlock the device, the operator must perform the additional step of manually removing the locking pin from the hole, overcoming the pressure from the spring. While this approach to locking and unlocking the device is functional, a device requiring fewer parts and fewer steps in the locking and unlocking process would be desirable.

Additionally, various tools have been used commercially for expanding elastic band in order to collar skirts for fishing lures. Typical of such devices is one which is very similar in appearance to a set of needle-nose pliers, but which operates in reverse fashion. That is, an elastic band is placed over the needle-nose prongs of the device, and the handles are then activated, causing the device to open rather than to close, as would be the case with needle-nose pliers. Like other band expanders for fishing lure skirts, such needle-nose devices generally suffer from stretching the elastic band in only a linear direction. This results in a mere slit in the elastic band, through which it is quite difficult to position material to be collared. One such needle-nose expander provides a bar which may be fixed at either of its ends to one handle of the device, and at its other end to the other handle of the device, to hold the device in the open position. The bar must then be removed to allow the device to close. While this approach is effective in locking the device in an open position, it requires additional parts and steps, and is awkward to use in practice.

There is thus a need for an elastic band expander which requires a minimum of effort to operate, and which expands an elastic band in more than a linear direction, in order to provide a sufficiently large opening in the band to facilitate the collaring operation. Further, there is a need for an expander which will easily lock into an open position, which may be quickly and easily unlocked, and which may generally be operated in such a way as to free the user's hands for other tasks.

SUMMARY OF THE INVENTION

In accordance with this invention an elastic band expander is provided which includes a base plate and a cam plate. Both plates have a center, and the cam plate is oriented in a plane parallel to the plane of the base plate, with the cam plate's center being located near the center of the base plate. Means are provided for rotatably securing the base plate to the cam plate. Three cam slots are located in the cam plate, with the cam slots each having an inner end nearer the center of the cam plate and an outer end further from the center, with the slots curving inward toward the center near their outer end. Three expander bars are provided, each having a proximal end near the center of the base plate, and a distal end furthest away from that center. Each expander bar has a finger extending approximately perpendicularly near its proximal end and a cam pin between its proximal and its distal end, with the cam pin being capable of movement in an associated one of the cam slots.

Three slots are located in the base plate, each of the slots being associated with a respective expander bar. The respective expander bars move outwardly in their associated slots as the cam plate is rotated clockwise, and inwardly as the cam plate is rotated in the opposite direction. In this way, when an elastic band is fitted around all of the fingers and the cam plate is rotated in a clockwise direction relative to the base plate, the cam pins move outwardly in their associated cam slots, causing the expander bars to move outwardly and expand the elastic band. The cam pins lock in place when the rotation of the cam plate causes them to reach the outer end of the cam slot, thereby locking the expander in the open position.

In view of the foregoing, several advantages of the present invention are readily apparent. An elastic band expander is provided which requires a minimum of effort to operate, and which expands an elastic band in three directions, thus providing a large triangular opening in the band to facilitate the collaring operation. Further, the expander easily locks into an open position, and may be quickly and easily unlocked. In general, the expander may be operated in such a way as to free the user's hands for other tasks.

Additional advantages of this invention will become apparent from the description which follows, taken in conjunction with the accompanying drawings.

BRIEF DESCRIPTION OF THE DRAWINGS

The invention will be more readily understood by reference to the accompanying drawings wherein like reference numerals indicate like elements, and wherein reference numerals sharing the same last two digits identify similar corresponding elements throughout the various disclosed embodiments, and in which.

DETAILED DESCRIPTION OF THE INVENTION

Figure 1:
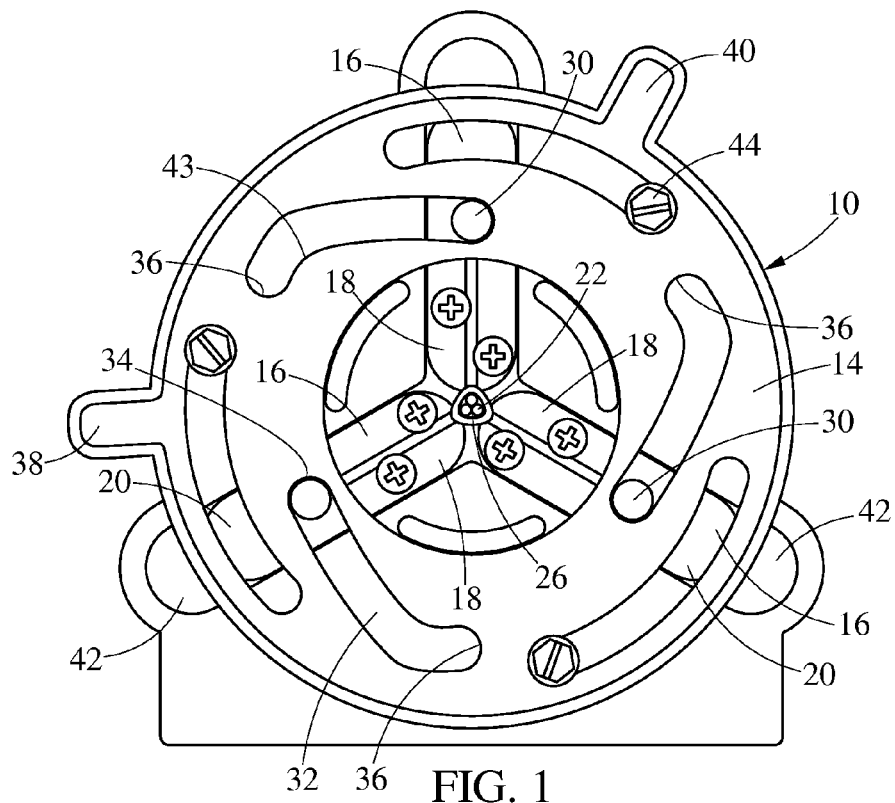
FIG. 1 is a front view of an elastic band expander according to the present invention, showing the expander and the elastic band in a closed position.
Figure 2:
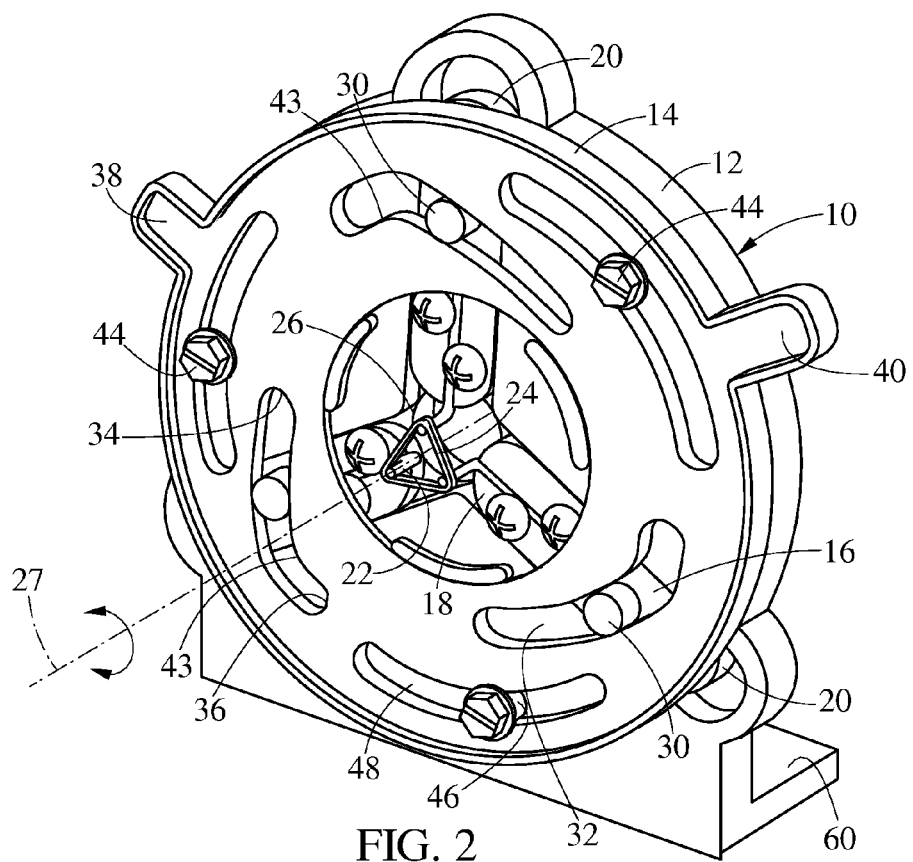
FIG. 2 is a perspective view showing the expander and the elastic band in a partially opened position.
Figure 3:
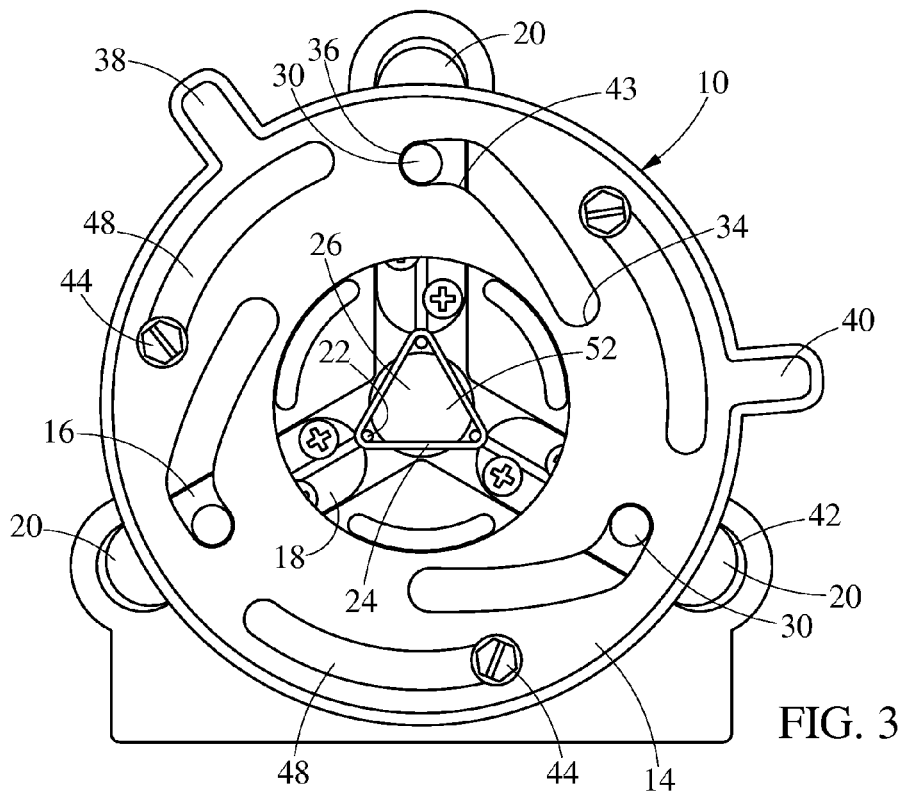
FIG. 3 is a front view showing the expander and the elastic band in a fully opened position.

Referring now to the drawings, as shown in FIGS. 1-3 there is depicted an elastic band expander 10 according to the present invention. The expander 10 includes a base plate 12 and a cam plate 14, mounted parallel to one another. Both plates 12,14 are preferably of a generally circular shape, and are ideally oriented to have a common center 26. The plates 12,14 are rotatably mounted together for rotation about an axis of rotation 27, which is perpendicular to both plates and extends through their center 26. Other shapes are certainly possible for the plates 12,14, but the expander operates most efficiently when the plates are oriented to rotate around a common geometric center.

Three expander bars 16 are also provided, each bar having a proximal end 18 and a distal end 20. Near the proximal end 18 of each bar 16 is a finger 22, which preferably extends perpendicularly to the bar 16. Collectively, the fingers 22 are arranged so as to receive the elastic band 24 to be stretched. The elastic band 24 is wrapped around the fingers 22 when the expander 10 is in its closed position, as depicted in FIG. 1. In this closed position, the fingers 22 are close together near the circular center 26 of the two plates 12,14 and of the expander 10.

Each of the bars 16 has a cam pin 30 which rides in its own cam slot 32, the cam slots 32 being cut through the cam plate 14. When the expander 10 is in its closed position, as shown in FIG. 1, the cam pins 30 rest at the inner end 34 of the respective cam slots 32. After the elastic band 24 is placed around the fingers 22, the expander is activated by turning the cam plate 14 in a clockwise direction. Optional gripping posts 38,40 provide convenient leverage points for gripping the cam plate 14 with the fingers in order to turn it.

As shown in FIG. 2, when the cam plate 14 is turned in a clockwise direction from its closed position of FIG. 1, the cam pins 30 ride laterally and outward in cam slots 32, causing the expander bars 16 to also move outward. This outward movement of the expander bars also moves the attached fingers 22 outward, thereby expanding the elastic band 24. In the preferred embodiment, the expander bars 16 are moveably mounted to base plate 12 so as to move radially to and from the center 26 (or axis 27) in expander slots 42. The slots 42 could alternatively be oriented at a non-radial angle away from the center 26. It would also be possible to have the expander bars pivot around their distal end 20, and to dispense with the expander slots altogether. However, the embodiment of FIGS. 1-3 is preferred because it is the most efficient to use, and also provides ease of manufacture and service.

The number of expander bars is also optional, so long as there are a sufficient number to stretch the elastic band 24 in more than a linear fashion. As discussed above, if the elastic band is stretched only linearly, a mere slit will be produced in the elastic band. This will be much more difficult to work with than the opening in an elastic band which has been stretched into at least a 3-sided shape.

Figure 4:
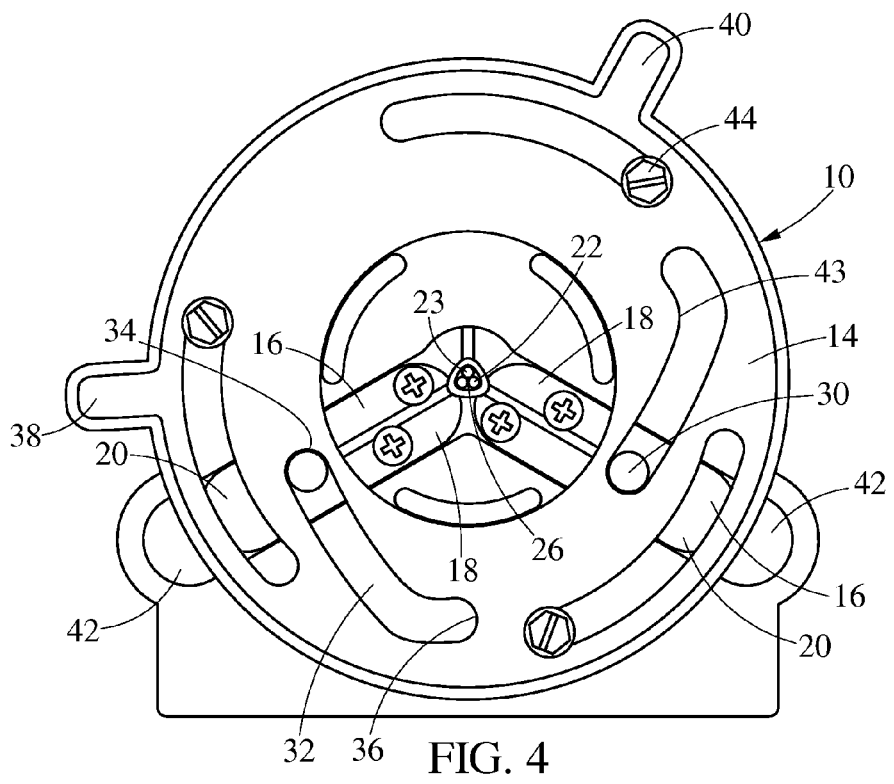
FIG. 4 is a front view of an alternative expander having a fixed finger, showing the expander in a closed position.
Figure 5:
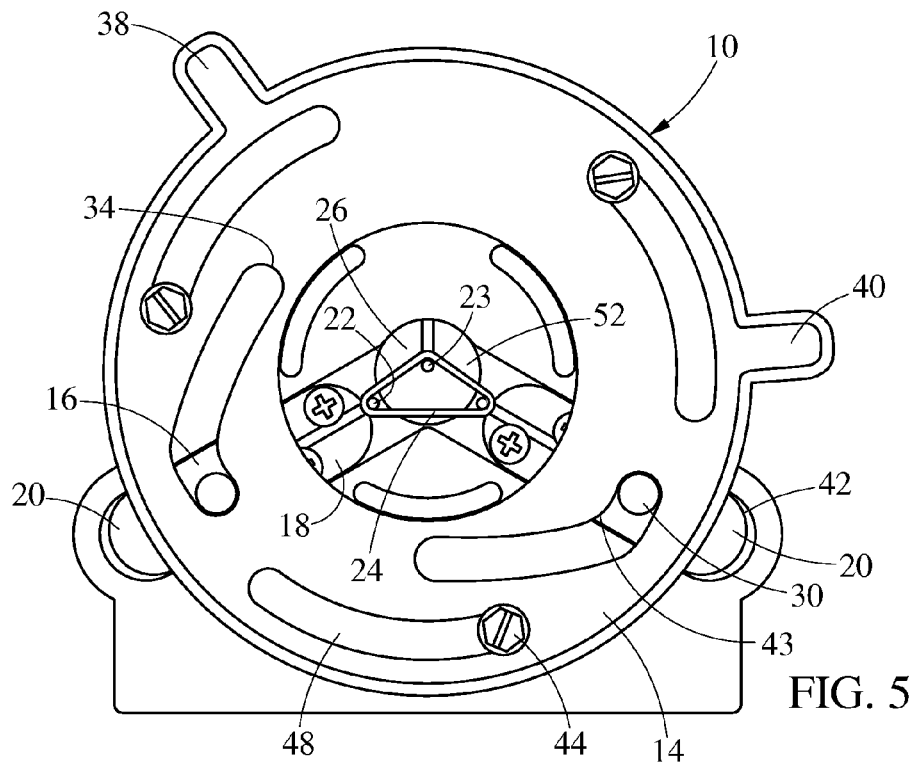
FIG. 5 is a front view of the expander of FIG. 4, showing the expander in a fully opened position.

Still another alternative is depicted in FIGS. 4 and 5, which show an embodiment providing three fingers for holding the elastic band, but only two expander bars. In this approach, a single finger 23 is located in a fixed position near the center 26 of the expander 10, while the two expander bars 16 still operate to pull the elastic band 24 into at least a 3-sided shape. The result is thus essentially the same as that shown in FIGS. 1-3, but the expanded elastic band is now somewhat skewed relative to the center 26 of the expander 10. While such an embodiment will work, the preferred embodiment of FIGS. 1-3 is more efficient to use, and is easier to manufacture and service.

As discussed above, the cam slots 32 have an inner end 34 and an outer end 36. Importantly, the cam slot 32 is non-linear in the sense that it curves (or turns) back toward the center 26 (or axis 27) near its outer end 36, i.e. as it approaches its outer end 36. The cam pin 30 is thus actually at its maximum distance from the center 26 of the expander 10 just prior to reaching the outer end 36 of the cam slot 32. As best seen in FIG. 3, this inward curve 43 of the cam slots 32, when coupled with the inward force applied to the expander bars 16 by the expanded elastic band 24, causes the cam pins 30 to lock in place when the cam plate 14 is fully rotated in a counterclockwise direction. This locking of the expander 10 in an open position is a highly useful feature, as it frees the user from having to hold the expander in the open position. This allows the user to have both hands free to work with whatever article is to be collared by the elastic band 24.

As an alternative to the inward curve 43 at the outer end of the cam slots 32, it is possible to have the slots 32 curve back at their outer end on a circular arc. That is, rather than curving inward, the slots 32 would curve back along an arc which is at all points equidistant from the center 26 of the cam plate 14. While this circular curvature would not provide the positive locking effect of an inward curvature, it would provide a locking effect which would be minimally sufficient to hold the expander 10 in the open position.

As seen in FIGS. 1-3, the cam plate 14 is held in place relative to the base plate 12 by hexagonal nuts 44, which are affixed to connecting posts 46 extending from base plate 12. As the cam plate 14 is rotated relative to the base plate 12, the connecting posts 46 travel in concentric slots 48. The width of the hex nuts 44 is greater than the width of the concentric slots 48, thus assuring that the base plate 12 and cam plate 14 are held together. Alternatively, it would be possible to eliminate the concentric slots 48 and the connecting posts 46 altogether, by simply positioning the hexagonal nuts 44 on top of the cam pins 30. However, for stability purposes as well as for ease of manufacture and service, the preferred embodiment is as shown in FIGS. 1-3.

Figure 6:
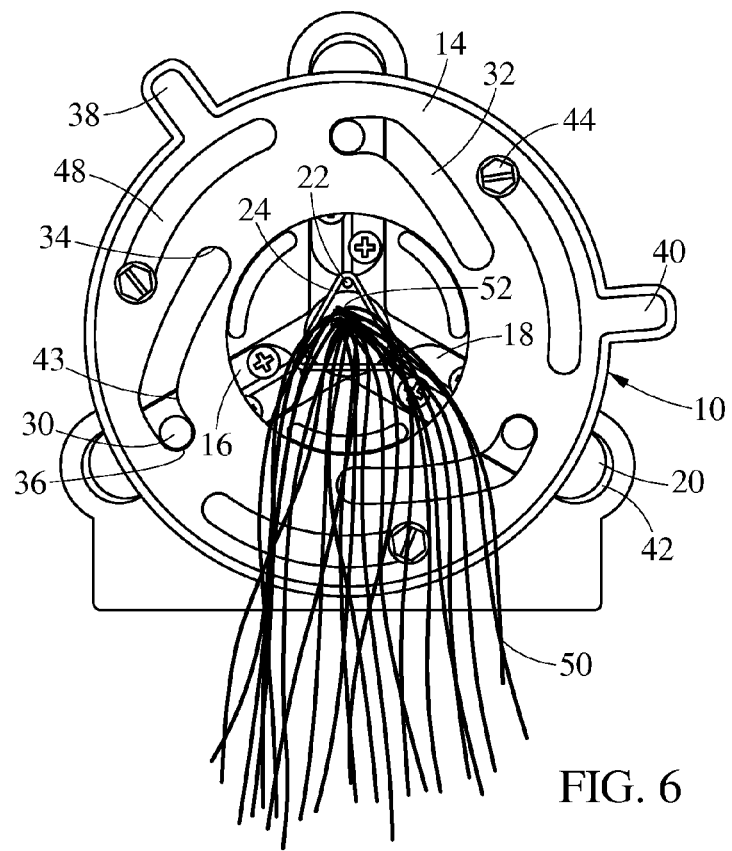
FIG. 6 is a front view as shown in FIG. 3, showing strands of material inserted through the center of the expander and of the elastic band, and in position to be collared.
Figure 7:
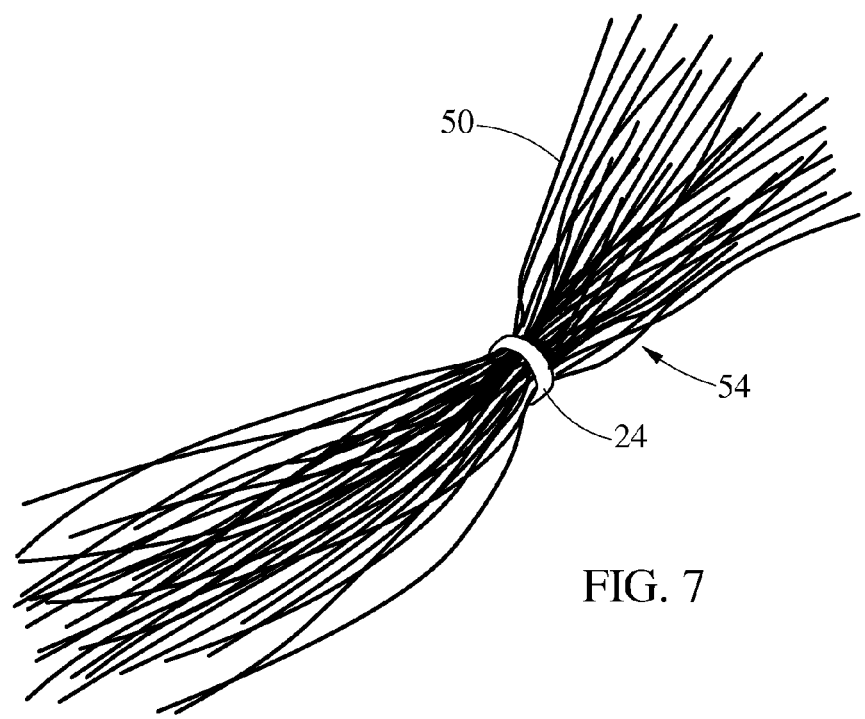
FIG. 7 is a perspective view of a completed fishing lure skirt, with the collar in place.

There are many uses for the expander 10 of the present invention. An example showing use of the expander 10 in the production of a skirt for fishing lures is depicted in FIGS. 6 and 7. As seen in FIG. 6, a collection of flexible strands 50 has been passed through the expanded elastic band 24 and the opening 52 in the cam plate 14 and base plate 12. The strands 50 are passed through the opening 52 until the desired point of collaring is situated directly in the opening 52. The cam plate 14 is then rotated in a counter-clockwise direction, closing the expander 10 and allowing the elastic band 24 to fully contract around the strands 50. It is worth noting that once the cam plate has been rotated counter-clockwise sufficiently to unlock the cam pins 30, the force exerted by the expanded elastic band 24 will automatically urge the expander 10 back toward its closed position of FIG. 1. Once the elastic band 24 has fully contracted around the strands 50, the strands are then pulled from the opening 52. This pulls the contracted band 24 from the fingers 22, leaving a properly collared fishing lure skirt 54, as depicted in FIG. 7.

Figure 8:
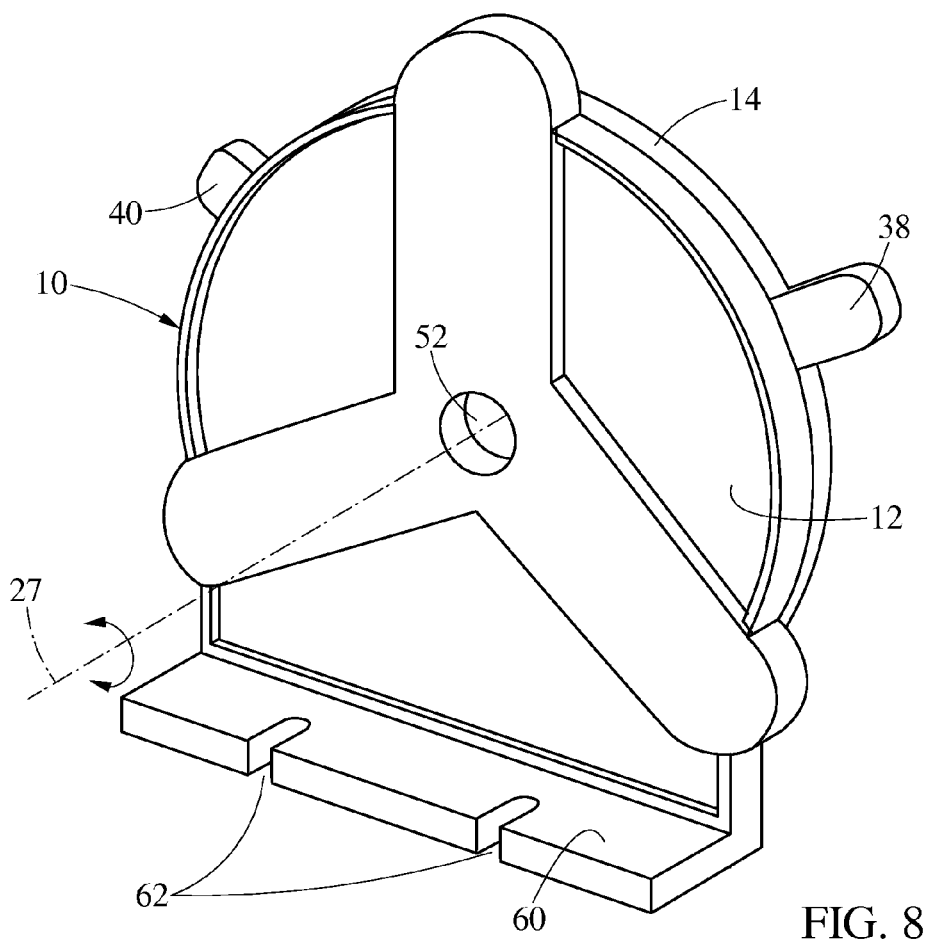
FIG. 8 is a rear perspective view of the expander, showing mounting slots on the base stand thereof.

Referring now to FIG. 8, another useful optional feature of the expander 10 is shown. A base stand 60 is provided, which has mounting slots 62 therein. By using mounting screws positioned in the slots 62, the expander 10 may be mounted to any surface, such as a desk top. In this way, both hands may be freed from any need for holding the expander 10 in place. Having this capability is useful in certain situations, notably in manufacturing applications utilizing the expander.

This invention has been described in detail with reference to particular embodiments thereof, but it will be understood that various other modifications can be effected within the spirit and scope of this invention.

I claim:

1. A tool for expanding an elastic band and releasing it for contraction about an object, comprising:
   a base plate having a center;
   a cam plate oriented in a plane parallel to the plane of said base plate and rotatably secured to said cam plate, and having a center located near the center of said base plate;
   at least three cam slots located in said cam plate, said cam slots each having an inner end nearer the center of said cam plate and an outer end further from said center, said slots curving inward toward said center near said outer end;
   at least three expander bars, each having a proximal end near the center of said base plate and a distal end furthest away from said center, and having a finger extending approximately perpendicularly near its proximal end and a cam pin between its proximal and its distal end, said cam pin being capable of movement in an associated one of said cam slots; and wherein each said expander bar is moveably mounted to said base plate for movement to and from the center of the cam plate so that when an elastic band is fitted around all of said fingers and said cam plate is rotated in a first direction relative to said base plate, said cam pins move outwardly in said associated cam slots, causing said expander bars to move outwardly and expand the elastic band, said cam pins locking in place when the rotation of the cam plate causes them to reach the outer end of said cam slot.

2. A tool as claimed in claim 1, wherein three slots are located in said base plate to facilitate movement of the expander bars to and from the center of the cam plate, each of said slots being associated with a respective expander bar, said respective expander bars moving outwardly in said associated slots as said cam plate is rotated in said first direction, and inwardly as said cam plate is rotated in the opposite direction.

3. A tool as claimed in claim 2, wherein:
   said expander bar slots are oriented in a radial direction relative to the center of said base plate.

4. A tool for expanding an elastic band and releasing it for contraction about an object, comprising:
   a base plate having a center;
   a cam plate oriented in a plane parallel to the plane of said base plate and rotatably secured to said cam plate, and having a center located near the center of said base plate;
   two cam slots located in said cam plate, said cam slots each having an inner end nearer the center of said cam plate and an outer end further from said center, said slots curving inward toward said center near said outer end;
   two expander bars, each having a proximal end near the center of said base plate and a distal end furthest away from said center, and having a finger extending approximately perpendicularly near its proximal end and a cam pin between its proximal and its distal end, said cam pin being capable of movement in an associated one of said cam slots;
   a finger located near the center of said base plate and extending approximately perpendicularly thereto;
   and wherein each said expander bar is moveably mounted to said base plate for movement to and from the center of the cam plate so that when an elastic band is fitted around all of said fingers and said cam plate is rotated in a first direction relative to said base plate, said cam pins move outwardly in said associated cam slots, causing said expander bars to move outwardly and expand the elastic band, said cam pins locking in place when the rotation of the cam plate causes them to reach the outer end of said cam slot.

5. A tool as claimed in claim 4, wherein two slots are located in said base plate to facilitate movement of the expander bars to and from the center of the cam plate, each of said slots being associated with a respective expander bar, said respective expander bars moving outwardly in said associated slots as said cam plate is rotated in said first direction, and inwardly as said cam plate is rotated in the opposite direction.

6. A tool as claimed in claim 5, wherein:
   said expander bar slots are oriented in a radial direction relative to the center of said base plate.

7. A tool for expanding an elastic band and releasing it for contraction about an object, comprising:
   a base plate;
   a cam plate oriented in a plane generally parallel to the plane of said base plate and being rotatably secured to said base plate for rotation about an axis extending through said base plate and cam plate;
   at least three non-linear cam slots located in said cam plate, said cam slots each having an inner end located towards the axis of said plates and an outer end located farther away from the axis and wherein each slot curves in a generally circular path relative to the axis as said slot approaches its outer end;
   an expander bar for each cam slot, each said bar having a proximal end near the axis and a distal end furthest away from said axis, and having a finger extending approximately perpendicularly near its proximal end and a cam pin between its proximal and its distal end, said cam pin being capable of movement in an associated one of said cam slots; and wherein each said expander bar is moveably mounted to said base plate for movement to and from the axis so that when an elastic band is fitted around all of said fingers and said cam plate is rotated in a first direction relative to said base plate, said cam pins move outwardly in said associated cam slots, causing said expander bars to move outwardly and expand the elastic band, said cam pins locking in place when the rotation of the cam plate causes them to reach the outer end of said cam slot.

8. A tool for expanding an elastic band and releasing it for contraction about an object, comprising:

a base plate;

a cam plate oriented in a plane parallel to the plane of said base plate, and being rotatably secured to said base plate for rotation about an axis extending through said base and cam plates;

at least three non-linear cam slots located in said cam plate, said cam slots each having an inner end located towards the axis of said plates and an outer end located farther away from the axis and wherein each slot turns inwardly back towards the axis as it approaches its outer end;

an expander bar for each cam slot, each said bar having a proximal end near the center of said base plate and a distal end furthest away from said center, and having a finger extending approximately perpendicularly near its proximal end and a cam pin between its proximal and its distal end, said cam pin being capable of movement in an associated one of said cam slots; and wherein each said expander bar is moveably mounted to said base plate for movement to and from the axis so that when an elastic band is fitted around all of said fingers and said cam plate is rotated in a first direction relative to said base plate, said cam pins move outwardly in said associated cam slots, causing said expander bars to move outwardly and expand the elastic band, said cam pins locking in place when the rotation of the cam plate causes them to reach the outer end of said cam slot.

* * * * *